(12) United States Patent
Seto et al.

(10) Patent No.: US 11,800,030 B2
(45) Date of Patent: Oct. 24, 2023

(54) POST-PROCESSING APPARATUS AND IMAGE FORMING SYSTEM INCORPORATING THE POST-PROCESSING APPARATUS

(71) Applicants: Kazuki Seto, Kanagawa (JP); Kei Sasaki, Kanagawa (JP)

(72) Inventors: Kazuki Seto, Kanagawa (JP); Kei Sasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/750,403

(22) Filed: May 23, 2022

(65) Prior Publication Data
US 2022/0394145 A1 Dec. 8, 2022

(30) Foreign Application Priority Data

Jun. 7, 2021 (JP) .................................. 2021-095305

(51) Int. Cl.
*H04N 1/00* (2006.01)
*G03G 15/00* (2006.01)

(52) U.S. Cl.
CPC ..... *H04N 1/00639* (2013.01); *G03G 15/6541* (2013.01); *H04N 1/0057* (2013.01); *H04N 1/00559* (2013.01); *H04N 1/00631* (2013.01)

(58) Field of Classification Search
CPC ........... B65H 2220/01; B65H 2801/27; B65H 31/26; B65H 2511/10; B65H 2511/13; B65H 2511/416; B65H 29/246; B65H 2220/09; B65H 31/10; B65H 31/36; B65H 37/04; B65H 2220/02; B65H 2220/11; B65H 31/38; B65H 2220/04; B65H 2301/4213; B65H 2301/4461; B65H 2404/1118; B65H 2406/11; B65H 2406/1132; B65H 2406/12; B65H 2406/121; B65H 2406/122; B65H 2406/14; B65H 2406/422; B65H 2407/51;
(Continued)

(56) References Cited

U.S. PATENT DOCUMENTS

| | | | | |
|---|---|---|---|---|
| 8,774,692 | B2 * | 7/2014 | Muramatsu | G03G 15/6585 399/329 |
| 9,004,671 | B2 * | 4/2015 | Sakano | B41J 13/0009 347/21 |

(Continued)

FOREIGN PATENT DOCUMENTS

| | | |
|---|---|---|
| JP | 2014-201432 | 10/2014 |
| JP | 2018-123007 | 8/2018 |

*Primary Examiner* — Negussie Worku
(74) *Attorney, Agent, or Firm* — XSENSUS LLP (57) ABSTRACT

A post-processing apparatus includes a tray, a conveyor, a liquid applicator, a crimper, and a mover. The tray holds recording media on each of which an image is formed by an image forming apparatus. The conveyor conveys the recording media toward the tray in a conveyance direction of the recording media. The liquid applicator applies liquid to the recording media held in the tray at a binding position at which the recording media is bound. The crimper presses and deforms the recording media at the binding position to bind the recording media. The mover moves the liquid applicator and the crimper separately along a surface of the recording media held in the tray.

11 Claims, 8 Drawing Sheets

(58) Field of Classification Search
CPC .......... B65H 2511/20; B65H 2511/222; B65H 2601/261; B65H 29/125; B65H 31/34; B65H 2513/512; B65H 2701/1313; B65H 2701/18271; B65H 2701/1829; B65H 2701/18292; B65H 31/02; B65H 45/18; B65H 9/004; B65H 1/04; B65H 2301/42146; B65H 2601/273; B65H 1/14; B65H 2301/36; B65H 2301/4212; B65H 2301/4223; B65H 2301/4229; B65H 2301/4421; B65H 2301/4505; B65H 2301/51232; B65H 2403/42; B65H 2403/544; B65H 2403/61; B65H 2403/72; B65H 2404/1521; B65H 2404/2614; B65H 2404/65; B65H 2405/1134; B65H 2405/1142; B65H 2405/15; B65H 2406/1211; B65H 2408/1222; B65H 2511/12; B65H 2511/51; B65H 2511/515; B65H 2513/40; B65H 2701/1123; B65H 2701/13212; B65H 2701/18262; B65H 2701/1932; B65H 2801/48; B65H 29/12; B65H 3/0692; B65H 3/48; B65H 3/68; B65H 37/06; B65H 43/00; B65H 45/04; B65H 45/30; B65H 5/023; B65H 9/002; B65H 9/101; B65H 9/166; B65H 2402/441; B65H 2402/442; B65H 2405/111646; B65H 2405/1117; B65H 2405/115; B65H 2407/22; B65H 2515/20; B65H 2553/61; B65H 2601/25; B65H 2801/39; B65H 1/00; B65H 2406/1222; B65H 2511/216; B65H 2601/324; G03G 15/6552; G03G 15/6541; G03G 15/6555; G03G 15/6544; G03G 15/6511; G03G 2215/00877; G03G 2215/00936; G03G 2215/00835; H04N 1/00559; H04N 1/0057; H04N 1/00631; H04N 1/00639

USPC ...................................................... 358/296

See application file for complete search history.

(56) References Cited

U.S. PATENT DOCUMENTS

| | | | | |
|---|---|---|---|---|
| 10,479,637 | B2* | 11/2019 | Morinaga | B31F 5/02 |
| 10,926,970 | B2* | 2/2021 | Tanoue | B42B 5/00 |
| 2005/0159215 | A1* | 7/2005 | Silverbrook | B41J 3/445 |
| | | | | 463/30 |
| 2008/0182740 | A1* | 7/2008 | Fukasawa | G03G 15/6582 |
| | | | | 399/361 |
| 2012/0133718 | A1* | 5/2012 | Sakano | B41J 11/0015 |
| | | | | 347/104 |
| 2014/0346728 | A1* | 11/2014 | Fuda | B65H 1/14 |
| | | | | 271/147 |
| 2015/0076759 | A1* | 3/2015 | Kosuge | G03G 15/6544 |
| | | | | 270/1.01 |
| 2017/0174465 | A1* | 6/2017 | Morinaga | B65H 37/04 |
| 2017/0315492 | A1* | 11/2017 | Kobayashi | G03G 15/6541 |
| 2018/0339485 | A1* | 11/2018 | Takahashi | B42C 1/12 |
| 2020/0172367 | A1* | 6/2020 | Tanoue | G03G 15/6544 |
| 2020/0172368 | A1* | 6/2020 | Susaki | B31F 1/07 |
| 2022/0334525 | A1* | 10/2022 | Sasaki | B65H 37/04 |
| 2022/0411222 | A1* | 12/2022 | Chihara | B65H 37/04 |

* cited by examiner

POST-PROCESSING APPARATUS AND IMAGE FORMING SYSTEM INCORPORATING THE POST-PROCESSING APPARATUS

CROSS-REFERENCE TO RELATED APPLICATION

This patent application is based on and claims priority pursuant to 35 U.S.C. § 119(a) to Japanese Patent Application No. 2021-095305, filed on Jun. 7, 2021, in the Japan Patent Office, the entire disclosure of which is hereby incorporated by reference herein.

BACKGROUND

Technical Field

Embodiments of the present disclosure relate to a post-processing apparatus and an image forming system incorporating the post-processing apparatus.

Background Art

In the related art, various post-processing apparatuses are known to bind a plurality of sheets on which an image is formed by an image forming apparatus as a bundle of sheets. Hereinafter, such a bundle of sheets is referred to as a "sheet bundle". Further, from a viewpoint of resource saving and ecology, some post-processing apparatuses include a crimper that executes "crimp binding" in which a sheet bundle is pressed and deformed (press-fitted) using serrated binding teeth without using staples.

The crimp binding has inconveniences such as a problem in that the binding teeth are less likely to bite into the sheet bundle as the number of sheets of the sheet bundle increases, and thus the sheet bundle cannot be appropriately bound. In order to increase the binding strength, some post-processing apparatuses that execute crimp binding include a liquid applicator that applies liquid in advance to a position (hereinafter, referred to as a "binding position") where the binding teeth come into contact with a sheet to make it easier for the binding teeth to bite into a sheet bundle.

SUMMARY

Embodiments of the present disclosure described herein provide a novel post-processing apparatus including a tray, a conveyor, a liquid applicator, a crimper, and a mover. The tray holds recording media on each of which an image is formed by an image forming apparatus. The conveyor conveys the recording media toward the tray in a conveyance direction of the recording media. The liquid applicator applies liquid to the recording media held in the tray at a binding position at which the recording media is bound. The crimper presses and deforms the recording media at the binding position to bind the recording media. The mover moves the liquid applicator and the crimper separately along a surface of the recording media held in the tray.

Further, embodiments of the present disclosure described herein provide an image forming system including an image forming apparatus and the above-described post-processing apparatus. The image forming apparatus forms an image on each of recording media. The post-processing apparatus executes crimp binding on the recording media.

BRIEF DESCRIPTION OF THE SEVERAL VIEWS OF THE DRAWINGS

Exemplary embodiments of this disclosure will be described in detail based on the following figures, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a post-processing apparatus and an image forming system incorporating the post-processing apparatus, according to an embodiment of the present disclosure, with reference to drawings. Note that identical parts or equivalents are given identical reference numerals and redundant descriptions are summarized or omitted accordingly.

Embodiments of the present disclosure are described below with reference to the attached drawings.

Hereinafter, a description is given of an image forming system 1 according to an embodiment of the present disclosure, with reference to the drawings.

Figure 1:
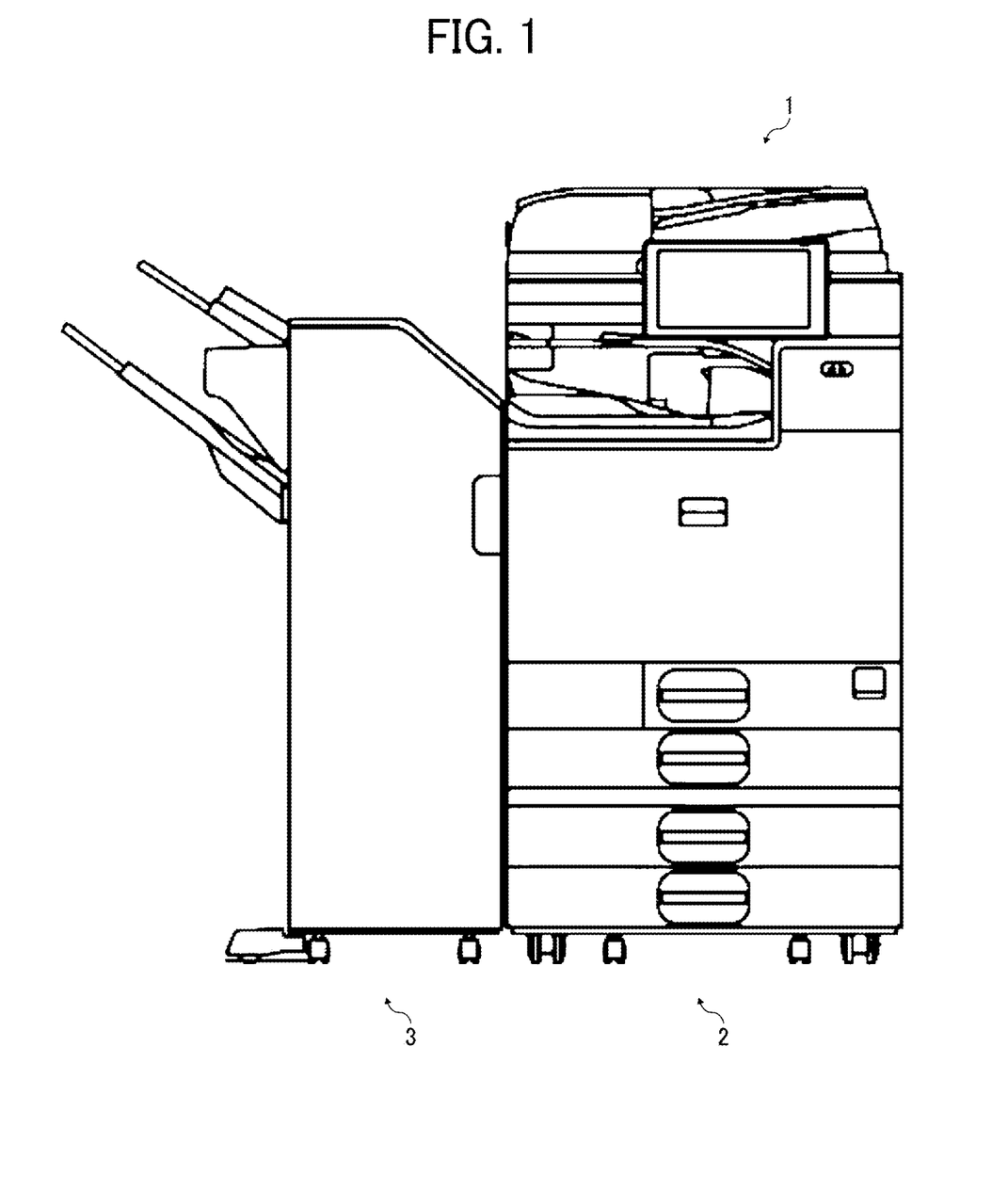
FIG. 1 is a diagram illustrating an overall configuration of an image forming system according to an embodiment of the present disclosure.

FIG. 1 is a diagram illustrating an overall configuration of the image forming system 1.

The image forming system 1 has a function of forming an image on a sheet P (recording medium) and executing post-processing on the sheet on which the image is formed. As illustrated in FIG. 1, the image forming system 1 includes an image forming apparatus 2 and a post-processing apparatus 3.

The image forming apparatus 2 forms an image on the sheet P and ejects the sheet having the image to the post-processing apparatus 3. The image forming apparatus 2 mainly includes a tray that holds a sheet P or sheets P (recording media), a conveyor that conveys the sheet P held in the tray, and an image forming device that forms an image on the sheet P conveyed by the conveyor. The image forming device may be an inkjet image forming device in which an image is formed with ink or an electrophotographic image forming device in which an image is formed with toner. Since the image forming apparatus 2 has a typical configuration, a detailed description of the configuration and functions of the image forming apparatus 2 are omitted.

Figure 2:
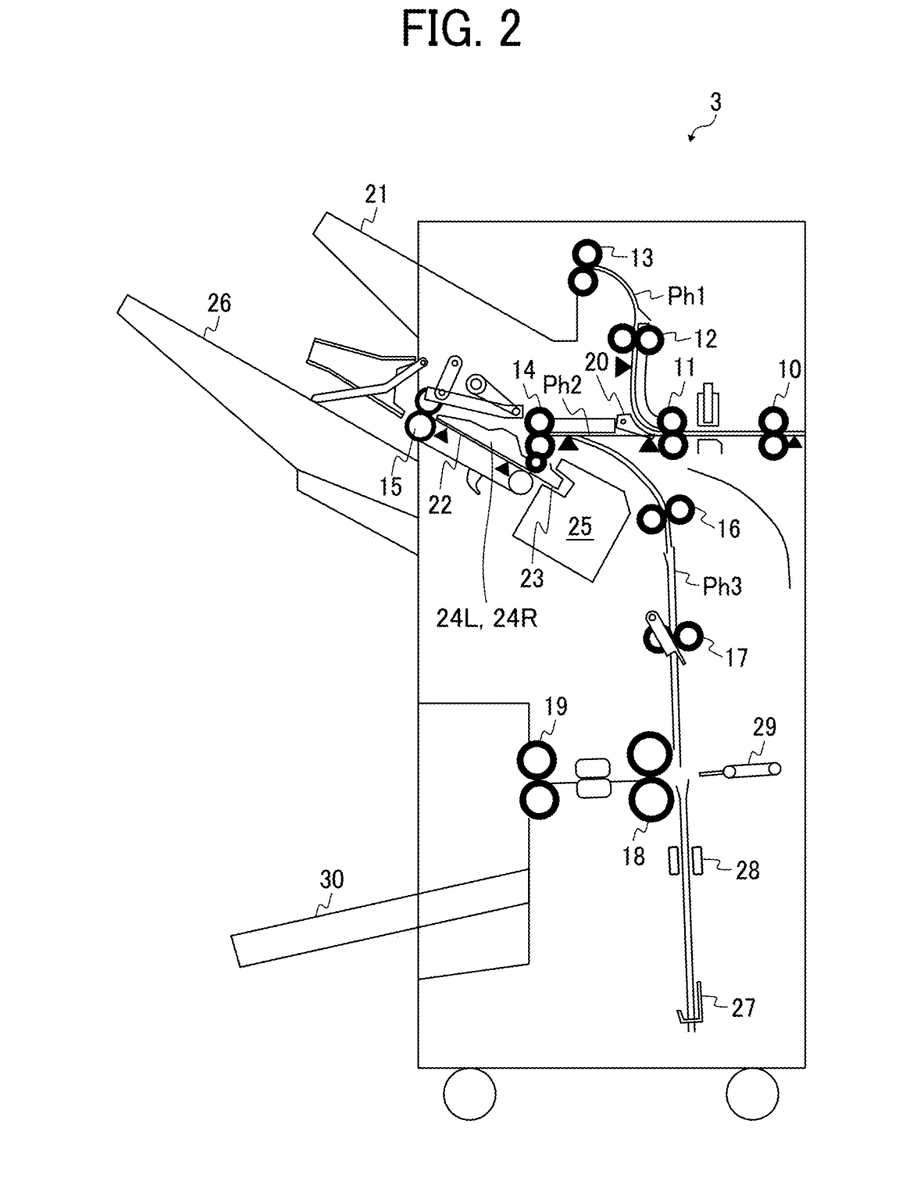
FIG. 2 is a diagram illustrating an internal configuration of a post-processing apparatus included in the image forming system of FIG. 1.

FIG. 2 is a diagram illustrating an internal configuration of the post-processing apparatus 3 included in the image forming system 1 of FIG. 1.

The post-processing apparatus 3 performs a post-processing process on the sheet P on which the image is formed by the image forming apparatus 2. For example, the post-processing executed by the post-processing apparatus 3 according to the present embodiment includes a stapling process in which sheets P each having an image are bound as a bundle of sheets P without using staples. Hereinafter, the bundle of sheets P is referred to as a "sheet bundle".) More specifically, the stapling process according to the present embodiment is so-called "crimp binding" in which a sheet bundle is pressed and deformed at a binding position. The stapling process includes an edge stitching process that binds an edge of each sheet bundle and saddle stitching process that binds the center of the sheet bundle.

The post-processing apparatus 3 includes the conveyance roller pairs 10 to 19 each functioning as a conveyor and the switching claw 20. The conveyance roller pairs 10 to 19 convey the sheet P fed from the image forming apparatus 2 so that the sheet P travels inside the post-processing apparatus 3. More specifically, the conveyance roller pairs 10 to 13 convey the sheet P along a first conveyance passage Ph1. The conveyance roller pairs 14 and 15 convey the sheet P along a second conveyance passage Ph2. Further, the conveyance roller pairs 16 to 19 convey the sheet P along a third conveyance passage Ph3.

The first conveyance passage Ph1 is a passage extending from a sheet supplying port of the sheet P from the image forming apparatus 2 to a sheet ejection tray 21. The second conveyance passage Ph2 is a passage branching from the first conveyance passage Ph1 between the conveyance roller pairs 11 and 14 in the conveyance direction of the sheet and extending to a sheet ejection tray 26 via the internal sheet tray 22. The third conveyance passage Ph3 is a passage branching from the first conveyance passage Ph1 between the conveyance roller pairs 11 and 14 in the conveyance direction of the sheet and extending to a sheet ejection tray 30.

The switching claw 20 is disposed at a branching position of the first conveyance passage Ph1 and the second conveyance passage Ph2. The switching claw 20 is switchable between a first position where the sheet P is ejected to the sheet ejection tray 21 through the first conveyance passage Ph1 and a second position where the sheet P conveyed through the first conveyance passage Ph1 is guided to the second conveyance passage Ph2. At the timing when the trailing end of the sheet P entering the second conveyance passage Ph2 passes between the rollers of the conveyance roller pair 11, the conveyance roller pair 14 is rotated in the reverse direction so that the sheet P is guided to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. Each of the plurality of sensors is indicated by a black triangle mark in FIG. 2.

The post-processing apparatus 3 further includes a sheet ejection tray 21. The sheet ejection tray 21 holds the sheet P ejected through the first conveyance passage Ph1. Among the sheets P supplied from the image forming apparatus 2, sheets P on which the stapling process is not executed are ejected to the sheet ejection tray 21.

The post-processing apparatus 3 includes the internal sheet tray 22 (tray), an end fence 23, side fences 24L and 24R, a binder 25, and a sheet ejection tray 26. The internal sheet tray 22, the end fence 23, the side fences 24L and 24R, and the binder 25 perform the edge stitching process on the sheet P conveyed in the second conveyance passage Ph2. Among the sheets P supplied from the image forming apparatus 2, a sheet bundle on which the edge stitching process is executed is ejected to the sheet ejection tray 26. Hereinafter, a direction from the conveyance roller pair 15 toward the end fence 23 is defined as a "sheet conveyance direction" of the sheet P. A direction orthogonal to the surface of the sheet P and the sheet conveyance direction of the sheet P is defined as a "main scanning direction (sheet width direction of the sheet P)".

The internal sheet tray 22 temporarily holds the plurality of sheets P sequentially conveyed through the second conveyance passage Ph2. The end fence 23 aligns the position of the sheet bundle held in the internal sheet tray 22 in the sheet conveyance direction of the sheet bundle. The side fences 24L and 24R align the position of the sheet bundle held in the internal sheet tray 22 in the main scanning direction. The binder 25 binds an end of the sheet bundle aligned by the end fence 23 and the side fences 24L and 24R.

Then, the conveyance roller pair 15 ejects the sheet bundle subjected to the edge stitching process to the sheet ejection tray 26.

Figure 3:
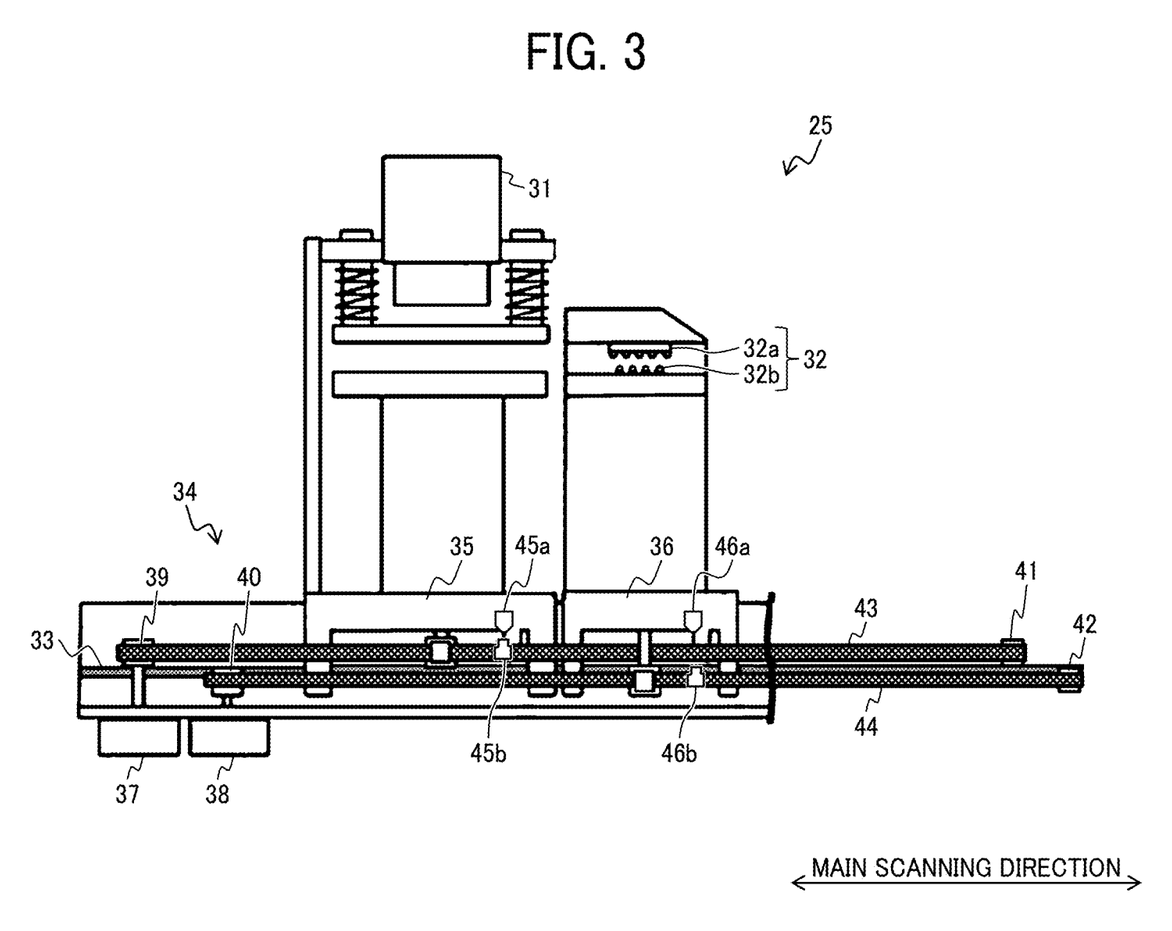
FIG. 3 is a schematic diagram illustrating a configuration of a binder.

FIG. 3 is a schematic diagram illustrating the configuration of the binder 25.

As illustrated in FIG. 3, the binder 25 mainly includes a liquid applicator 31, a crimper 32, a guide shaft 33, and a moving mechanism 34. The liquid applicator 31 and the crimper 32 are disposed downstream from the internal sheet tray 22 in the conveyance direction of the sheet P and adjacent to each other in the main scanning direction. The guide shaft 33 extends in the main scanning direction at a position downstream from the internal sheet tray 22 in the conveyance direction of the sheet P.

The liquid applicator 31 applies liquid (for example, water) that is stored in a tank to the sheet P held in the internal sheet tray 22. Hereinafter, application of liquid to a sheet such as the sheet P is referred to as "liquid application." The liquid applicator 31 is movably supported by the guide shaft 33 via a liquid application base 35 to move in the main scanning direction. Since the liquid applicator 31 has a typical configuration, a detailed description of the configuration and functions of the liquid applicator 31 are omitted.

The crimper 32 binds the sheet bundle by pressing and deforming (crimping) the sheet bundle using serrated binding teeth. Hereinafter, this binding process is referred to as a "crimp binding". In other words, the crimper 32 binds the sheet bundle without using staples. The crimper 32 is movably supported by the guide shaft 33 via a crimping base 36 to move in the main scanning direction.

Figure 4A:
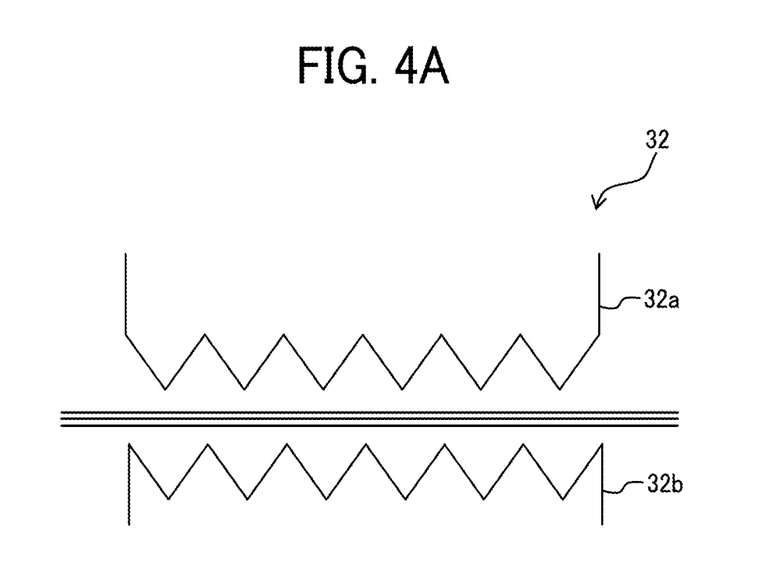
FIGS. 4A and 4B are schematic diagrams, each illustrating a configuration of a crimper.
Figure 4B:
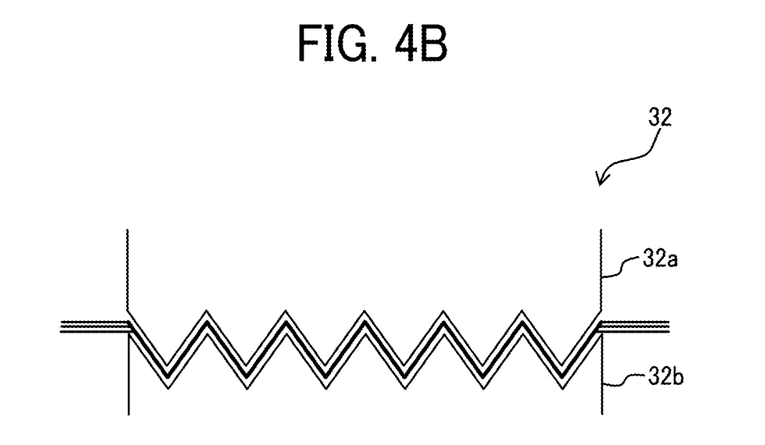

FIGS. 4A and 4B are schematic diagrams, each illustrating the configuration of the crimper 32.

As illustrated in FIGS. 4A and 4B, the crimper 32 includes a first member 32a and a second member 32b.

The first member 32a and the second member 32b are disposed to face each other in the thickness direction of the sheet bundle with the sheet bundle held in the internal sheet tray 22 interposed between the first member 32a and the second member 32b. A serrated binding teeth in which concave portions and convex portions are alternately formed is formed on the surface of the first member 32a and the surface of the second member 32b facing each other. Further, the binding teeth of the first member 32a and the binding teeth of the second member 32b are formed such that concave portions and convex portions are shifted from each other so as to mesh with each other.

In a process in which the plurality of sheets P of the sheet bundle are supplied to the internal sheet tray 22, the first member 32a and the second member 32b are spaced away from each other, as illustrated in FIG. 4A. Then, when each sheet P of the sheet bundle is held in the internal sheet tray 22, the binding teeth of the first member 32a and the binding teeth of the second member 32b are engaged with each other to press and deform the sheet bundle in the thickness direction, as illustrated in FIG. 4B. As a result, the sheet bundle held in the internal sheet tray 22 is crimped and bound. Further, the sheet bundle subjected to the crimp binding is ejected to the sheet ejection tray 26 by the conveyance roller pair 15.

The moving mechanism 34 that functions as a mover moves the liquid applicator 31 and the crimper 32 separately in the main scanning direction along the downstream end of the sheet P held in the internal sheet tray 22, in the conveyance direction of the sheet P. More specifically, the moving mechanism 34 moves the liquid applicator 31 and crimper 32 separately in the main scanning direction along the guide shaft 33. As illustrated in FIG. 3, the moving mechanism 34 mainly includes a liquid application motor 37, a crimping motor 38, drive pulleys 39 and 40, driven pulleys 41 and 42, endless loop belts 43 and 44, and position sensors 45 and 46. However, the specific configuration of the moving mechanism 34 is not limited to the example illustrated in FIG. 3.

The liquid application motor 37 generates a driving force for moving the liquid applicator 31. The drive pulley 39 and the driven pulley 41 are rotatably supported by the frame of the binder 25 at positions separated from each other in the main scanning direction. The endless loop belt 43 is wound around the drive pulley 39 and the driven pulley 41. The drive pulley 39 is coupled to the output shaft of the liquid application motor 37. The liquid application base 35 is fixed to the endless loop belt 43. Due to this configuration, the endless loop belt 43 rotates around and between the drive pulley 39 and the driven pulley 41 by the driving force of the liquid application motor 37. As a result, the liquid applicator 31 moves in the main scanning direction.

Figure 5:
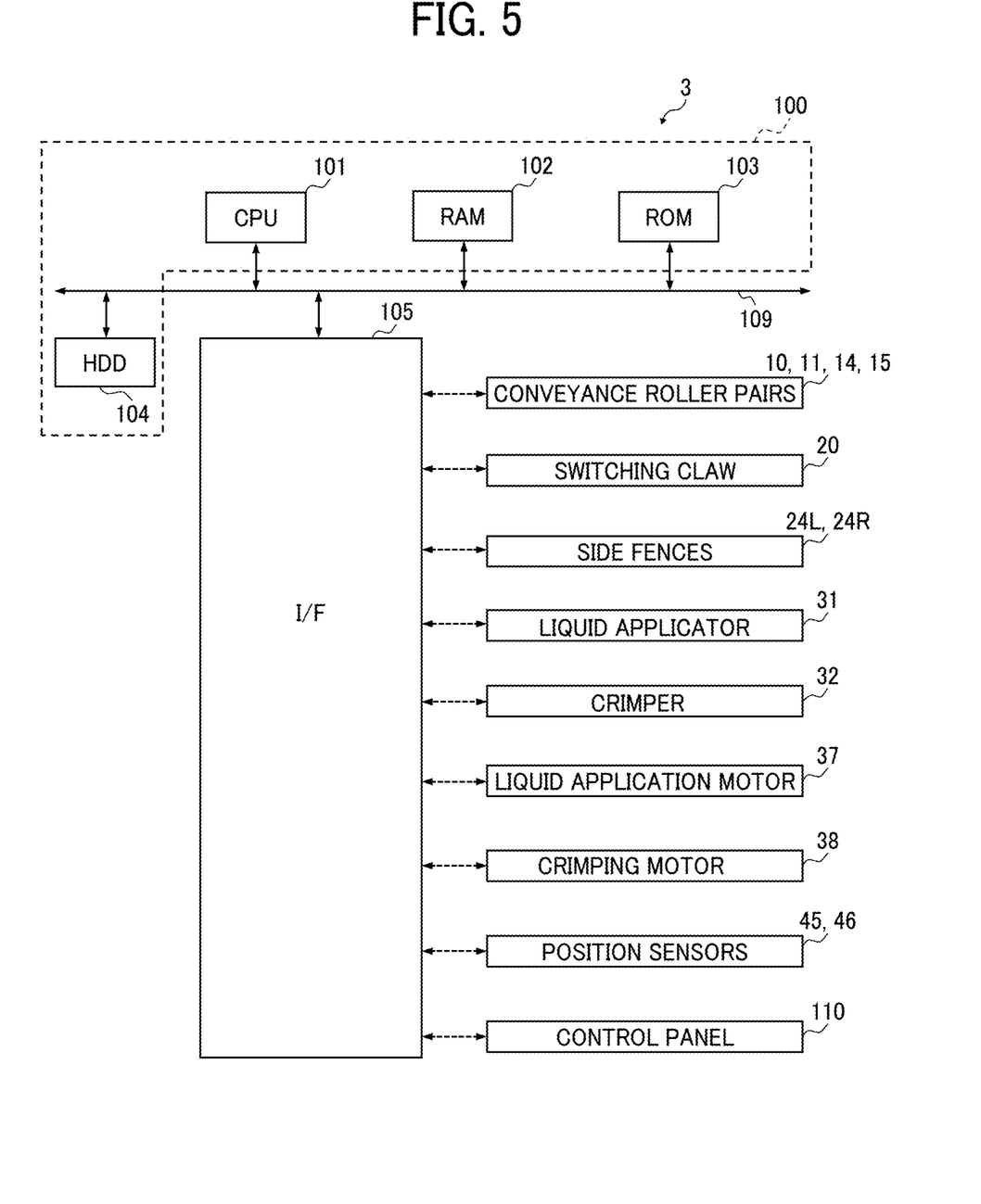
FIG. 5 is a schematic block diagram illustrating a hardware configuration of the post-processing apparatus of FIG. 2.

The position sensor 45 detects that the liquid applicator 31 has reached a predetermined home position, and then outputs a detection signal indicating the detection result to the controller 100 (see FIG. 5). Hereinafter, the home position of the liquid applicator 31 is referred to as "home position HP1." The position sensor 45 includes a detection unit 45a that is fixed to the home position HP1 and a detection object 45b that is fixed to the endless loop belt 43. Then, the position sensor 45 outputs the detection signal to the controller 100 after the detection unit 45a and the detection object 45b face each other. Note that the position sensor 45 may employ a known configuration such as a mechanical sensor, a magnetic sensor, or an optical sensor.

The crimping motor 38 generates a driving force for moving the crimper 32. The drive pulley 40 and the driven pulley 42 are rotatably supported by the frame of the binder 25 at positions separated from each other in the main scanning direction. The endless loop belt 44 is wound around the drive pulley 40 and the driven pulley 42. The drive pulley 40 is coupled to the output shaft of the crimping motor 38. The crimping base 36 is fixed to the endless loop belt 44. Due to this configuration, the endless loop belt 44 rotates around and between the drive pulley 40 and the driven pulley 42 by the driving force of the crimping motor 38. As a result, the crimper 32 moves in the main scanning direction.

A position sensor 46 detects that the crimper 32 has reached a predetermined home position, and then outputs a detection signal indicating the detection result to the controller 100. Hereinafter, the home position of the crimper 32 is referred to as "home position HP2." The position sensor 46 includes a detection unit 46a that is fixed to the home position HP2 and a detection object 46b that is fixed to the endless loop belt 44. Then, the position sensor 46 outputs the detection signal to the controller 100 after the detection unit 46a and the detection object 46b face each other. Note that the position sensor 46 may employ a known configuration such as a mechanical sensor, a magnetic sensor, or an optical sensor.

Figure 7A:
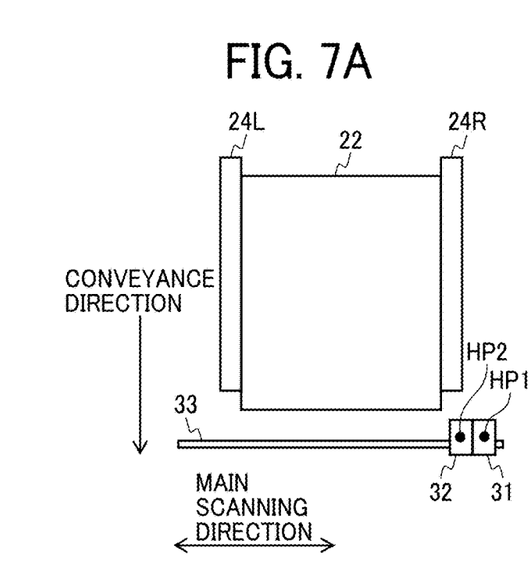
FIGS. 7A, 7B, and 7C are diagrams, each illustrating the positions of a liquid applicator and a crimper while the stapling process is executed.

Note that, as illustrated in FIG. 7A, the home position HP1 of the liquid applicator 31 and the home position HP2 of the crimper 32 are positions located outside the internal sheet tray 22 in the main scanning direction. Further, the home position HP1 of the liquid applicator 31 and the home position HP2 of the crimper 32 are different positions in the main scanning direction. The home position HP1 of the liquid applicator 31 according to the present embodiment is disposed at a position away from the internal sheet tray 22 than the home position HP2 of the crimper 32 in the main scanning direction.

Further, referring back to FIG. 2, the post-processing apparatus 3 further includes an end fence 27, a binder 28, a sheet folding blade 29, and a sheet ejection tray 30. The end fence 27, the binder 28, and the sheet folding blade 29 perform a saddle stitching process on sheets P conveyed through the third conveyance passage Ph3. Among the sheets P supplied from the image forming apparatus 2, a sheet bundle subjected to the saddle stitching process is ejected to the sheet ejection tray 30.

The end fence 27 aligns the positions of the sheets P sequentially conveyed through the third conveyance passage Ph3 in the sheet conveyance direction of the sheet bundle. Further, the end fence 27 is movable between a binding position where the center of the sheet bundle faces the binder 28 and a folding position where the center of the sheet bundle faces the sheet folding blade 29. The binder 28 binds the center of the sheet bundle aligned by the end fence 27 at the binding position. The sheet folding blade 29 folds the sheet bundle in half while the sheet bundle is supported by the end fence 27 at the folding position, and then brings the sheet bundle to the conveyance roller pair 18 so that the conveyance roller pair 18 nips the sheet bundle. Then, the conveyance roller pairs 18 and 19 eject the sheet bundle subjected to the saddle stitching process to the sheet ejection tray 30.

FIG. 5 is a schematic block diagram illustrating a hardware configuration of the post-processing apparatus 3.

As illustrated in FIG. 5, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected each other via a common bus 109.

The CPU 101 is an arithmetic unit and controls the operation of the overall operation of the post-processing apparatus 3. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

The post-processing apparatus 3 processes, by an arithmetic function of the CPU 101, e.g., a control program stored in the ROM 103 and an information processing program (or application program) loaded into the RAM 102 from a storage medium such as the HDD 104. Such processing configures a software controller including various functional modules of the post-processing apparatus 3. The software controller thus configured cooperates with hardware resources of the post-processing apparatus 3 construct functional blocks to implement functions of the post-processing apparatus 3. In other words, the CPU 101, the RAM 102, the ROM 103, and the HDD 104 implement the controller 100 that controls the operation of the post-processing apparatus 3.

The I/F 105 is an interface that connects the conveyance roller pairs 10, 11, 14, and 15, the switching claw 20, the side fences 24L and 24R, the liquid applicator 31, the crimper 32, the liquid application motor 37, the crimping motor 38, the position sensors 45 and 46, and a control panel 110, to the common bus 109. The controller 100 drives the conveyance roller pairs 10, 11, 14, and 15, the switching claw 20, the side fences 24L and 24R, the liquid applicator 31, the crimper 32, the liquid application motor 37, and the crimping motor 38, via the I/F 105. Although FIG. 5 illustrates the components that execute the edge stitching process, the components that execute the saddle stitching process are also similarly controlled by the controller 100.

The control panel 110 includes an operation unit that receives an operation instruction from the user and a display (notification unit) that notifies the user of information. The operation unit includes, for example, hard keys and a touch panel superimposed on a display. The control panel 110 acquires information from the user through the operation unit and provides the information to the user through the display. Note that a specific example of the notification unit is not limited to the display and may be an LED lamp or a speaker.

Figure 6:
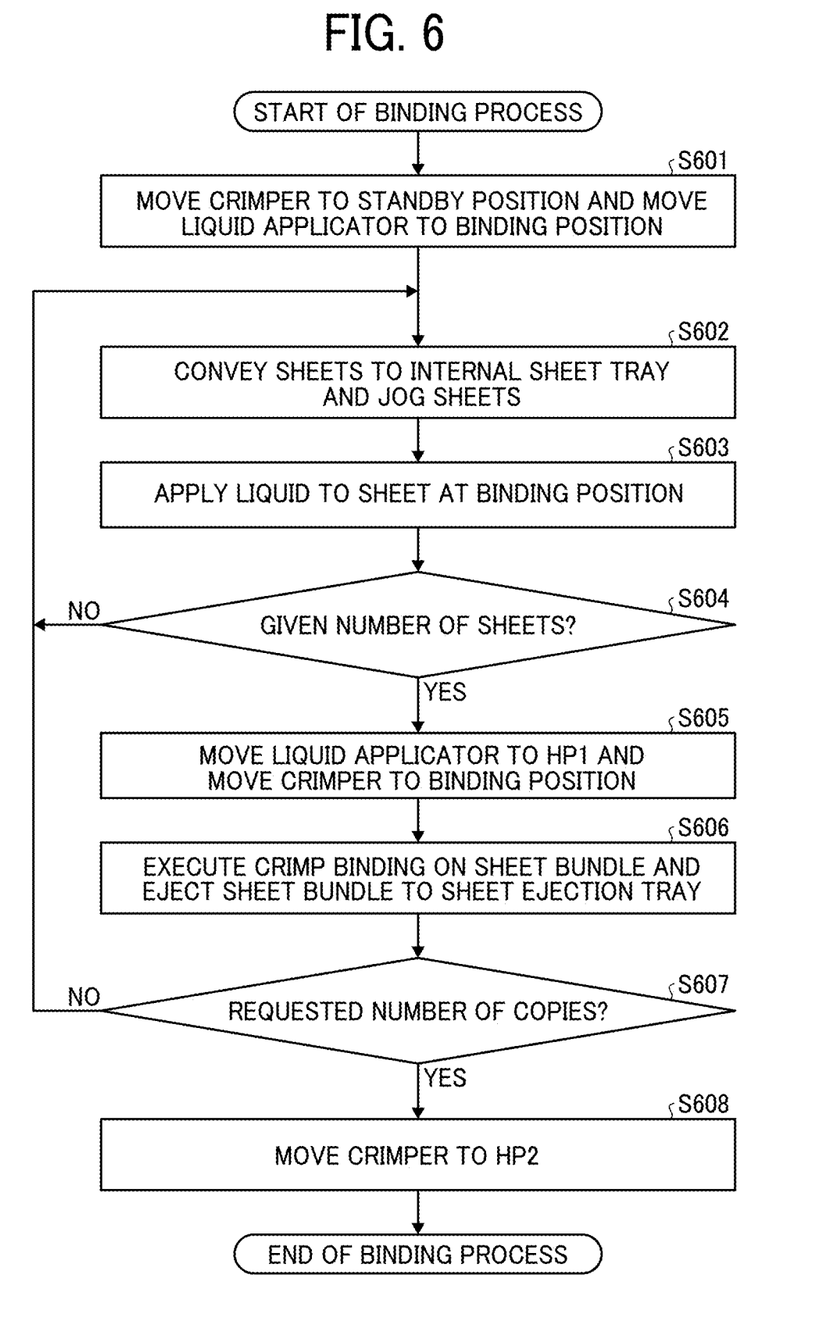
FIG. 6 is a flowchart of a stapling process.

FIG. 6 is a flowchart of a stapling process.

Figure 7B:
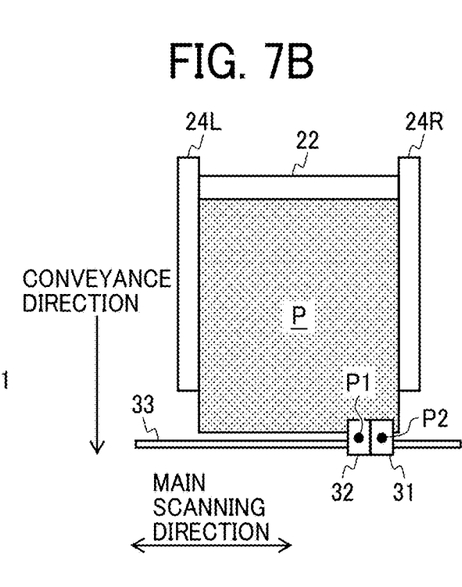
Figure 7C:
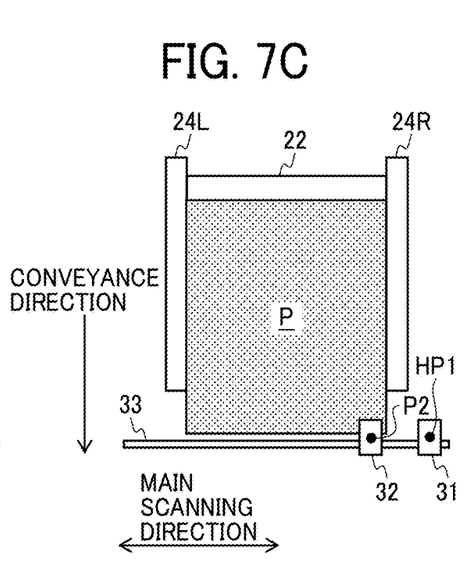

FIGS. 7A, 7B, and 7C are diagrams, each illustrating the positions of the liquid applicator 31 and the crimper 32 while a stapling process is executed.

The controller 100 starts the stapling process illustrated in FIG. 6, for example, at a timing when an instruction to execute the stapling process (hereinafter, referred to as a "stapling command") is acquired from the image forming apparatus 2. The stapling command includes, for example, the number of sheets P included in the sheet bundle (hereinafter referred to as a "given number of sheets") and the number of sheet bundles on which the stapling process is executed (hereinafter referred to as a "requested number of copies"). Note that the liquid applicator 31 is at the home position HP1 and the crimper 32 is at the home position HP2 at the start of the stapling process (FIG. 7A).

First, as illustrated in FIG. 7B, the controller 100 drives the crimping motor 38 to move the crimper 32 from the home position HP2 to the standby position P1, and then drives the liquid application motor 37 to move the liquid applicator 31 from the home position HP1 to the binding position P2 (step S601). Note that the controller 100 executes the processing of step S601 before a first sheet P is conveyed to the internal sheet tray 22 by the conveyance roller pairs 10, 11, 14, and 15.

Each of the standby position P1 and the binding position P2 is a position that may face the sheet P held in the internal sheet tray 22. The standby position P1 and the binding position P2 are positions different from the home positions HP1 and HP2. More specifically, the standby position P1 is closer to the center of the sheet P than the binding position P2 in the main scanning direction orthogonal to the conveyance direction of the sheet P. The binding position P2 is a position at which the liquid applicator 31 applies liquid to the sheet in step S603 described below and the crimper 32 performs crimp binding in step S606 described below. The standby position P1 and the binding position P2 may be included in the stapling command or may be instructed by a user via the control panel 110. The controller 100 may grasp the positions of the liquid applicator 31 and the crimper 32 by, for example, encoder sensors attached to the output shafts of the liquid application motor 37 and the crimping motor 38.

Then, the controller 100 causes the conveyance roller pairs 10, 11, 14, and 15 to rotate, so as to convey the sheet P on which the image is formed by the image forming apparatus 2 to be stacked (held) in the internal sheet tray 22 (step S602). Further, the controller 100 aligns (jogs) the position of the sheet bundle held in the internal sheet tray 22 in the main scanning direction by moving the side fences 24L and 24R. This alignment of the position of a sheet bundle is also referred to as jogging.

Next, the controller 100 causes the liquid applicator 31 at the binding position P2 to apply liquid to the sheet P held in the internal sheet tray 22 in step S602 (step S603). Next, the controller 100 determines whether or not the number of sheets P held in the internal sheet tray 22 reaches the given number of sheets indicated by the stapling command (step S604). When the controller 100 determines that the number of sheets stacked in the internal sheet tray 22 does not reach the given number of sheets (NO in step S604), the controller 100 executes the process of step S602 again. In other words, the controller 100 executes the processing of step S603 each time the sheet P is conveyed to the internal sheet tray 22 by the conveyance roller pairs 10, 11, 14, and 15.

When the controller 100 determines that the number of sheets P held in the internal sheet tray 22 reaches the given number of sheets (YES in step S604), the controller 100 drives the liquid application motor 37 to move the liquid applicator 31 from the binding position P2 to the home position HP1 and drives the crimping motor 38 to move the crimper 32 from the standby position P1 to the binding position P2, as illustrated in FIG. 7C (step S605). Note that the destination of movement of the liquid applicator 31 in step S605 is not limited to the home position HP1 as long as the position is different from the binding position P2.

Next, the controller 100 executes crimp binding on the sheet bundle held in the internal sheet tray 22 and ejects the sheet bundle to the sheet ejection tray 26 (step S606). More specifically, the controller 100 drives the crimper 32 at the binding position P2 to perform crimp binding (press-fitting) on the sheet bundle held in the internal sheet tray 22. Next, the controller 100 causes the conveyance roller pair 15 to rotate so as to eject the sheet bundle subjected to the crimp binding, to the sheet ejection tray 26.

Next, the controller 100 determines whether or not the number of sheets ejected to the sheet ejection tray 26 reaches a requested number of copies indicated by the binding command (step S607). When the controller 100 determines that the number of sheet bundles ejected to the sheet ejection tray 26 has not reached the requested number of copies indicated by the stapling command (NO in step S607), the controller 100 executes the processing of step S602 and subsequent steps again. In other words, when the controller 100 determines that the number of sheet bundles ejected to the sheet ejection tray 26 has not reached the requested number of copies indicated by the stapling command (NO in step S607), the controller 100 repeatedly executes the processing of steps S602 to S606 until the number of sheet bundles ejected to the sheet ejection tray 26 reaches the requested number of copies.

Then, when the number of sheets reaches the requested number of copies (YES in step S607), the controller 100 drives the crimping motor 38 to move the crimper 32 from the binding position P2 to the home position HP2 (step S608). Then, the stapling process ends. As a result, the liquid applicator 31 and the crimper 32 return to the positions illustrated in FIG. 7A.

According to the above-described embodiment, the following operational effects, for example, are achieved.

According to the above-described embodiment, since the liquid applicator 31 and the crimper 32 are moved by the separate motors, i.e., the liquid application motor 37 and the crimping motor 38, the mass moved by each of the liquid application motor 37 and the crimping motor 38, in other words, the load of each of the liquid application motor 37 and the crimping motor 38, is reduced. As a result, the durability of the moving mechanism 34 is enhanced and the noise during movement of the liquid applicator 31 and the crimper 32 is reduced.

In addition, according to the above-described embodiment, since the moving mechanism 34 includes two motors, i.e., the liquid application motor 37 and the crimping motor 38, the liquid applicator 31 and the crimper 32 move simultaneously in steps step S601 and S605. As a result, the processing speed of the stapling process is enhanced. However, the configuration of the moving mechanism 34 is not limited to the example described above. As another example, the moving mechanism 34 may include a single motor and a switching mechanism that selectively transmits the driving force of the single motor to either of the liquid applicator 31 and the crimper 32. The switching mechanism is achieved by a known configuration in which, for example, gears, clutches, and an endless loop belt are combined.

Further, according to the above-described embodiment, since the liquid applicator 31 and the crimper 32 share the guide shaft 33 to be supported by the guide shaft 33 to move in the main scanning direction, the structure is simplified. However, the configuration for supporting the liquid applicator 31 and the crimper 32 is not limited to the example described above. Further, the direction of movement of each of the liquid applicator 31 and the crimper 32 is not limited to the main scanning direction, and may be the main scanning direction and the conveyance direction of the sheet P (sub-scanning direction) as long as the liquid applicator 31 and the crimper 32 moves in the direction along the surface of the sheet P held in they are directions along the surfaces of the sheets P held in the internal sheet tray 22.

Further, according to the above-described embodiment, while the given number of sheets P is held in the internal sheet tray 22, the controller 100 causes the crimper 32 to stand by at the standby position P1. As a result, even when both ends of the sheet P in the main scanning direction are curled, the sheet P is appropriately inserted between the first member 32a and the second member 32b.

In addition, according to the above-described embodiment, even when the number of sheets P of the sheet bundle is relatively large, liquid application to each of the given number of sheets P contributes to appropriate crimp binding. However, the liquid applicator 31 may apply liquid to part of the given number of sheets P.

In the above-described embodiment, the application of liquid by the liquid applicator 31 may be omitted.

Figure 8A:
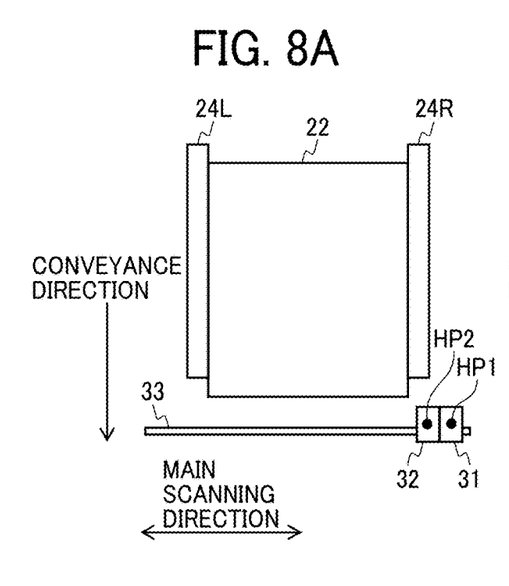
FIGS. 8A, 8B, and 8C are diagrams, each illustrating the positions of the liquid applicator and the crimper when application of liquid is omitted while the stapling process is executed.
Figure 8B:
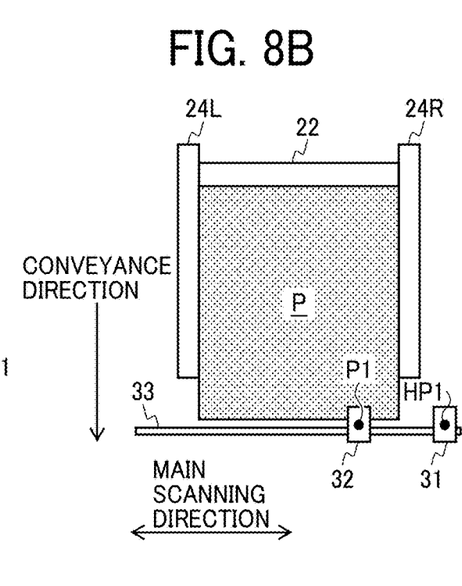
Figure 8C:
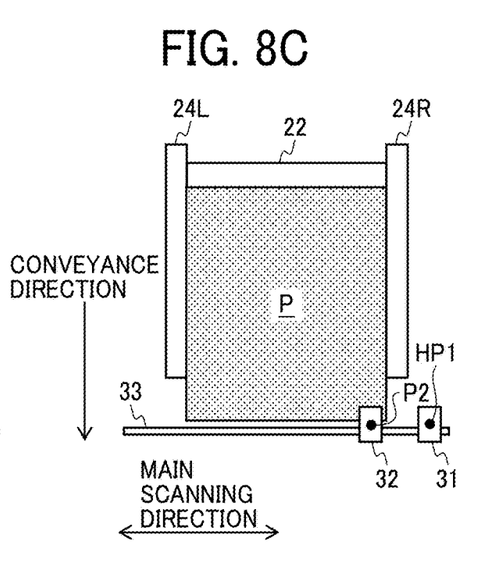

FIGS. 8A, 8B, and 8C are diagrams, each illustrating the positions of the crimper 32 when application of liquid is omitted while the stapling process is executed.

When application of liquid is omitted, the controller 100 causes the liquid applicator 31 to be retracted at the home position HP1 and the crimper 32 alone to move. In this case, predetermined post-processing may be performed by driving the crimping motor 38 alone without driving the liquid application motor 37. In other words, energy saving is achieved by adjusting the number of drive sources to be driven simultaneously.

When application of liquid by the liquid applicator 31 is omitted, the controller 100 omits movement of the liquid applicator 31 in steps S601 and S605. More specifically, the controller 100 causes the crimper 32 to move from the home position HP2 to the standby position P1, in step S601 (FIG. 8B). Further, the controller 100 causes the crimper 32 to move from the standby position P1 to the binding position P2 in step S605 (FIG. 8C). Furthermore, the controller 100 causes the crimper 32 to move from the binding position P2 to the home position HP2 in step S608 (FIG. 8A). On the other hand, the liquid applicator 31 continuously remains at the home position HP1 from the start to the end of the stapling process.

Note that whether to apply liquid to the sheet P may be designated by the user through the control panel 110 or may be determined by the controller 100.

As an example, the controller 100 may determine to apply liquid when the number of sheets P of the sheet bundle (i.e., the given number of sheets) is equal to or greater than a threshold value and may determine to omit applying liquid when the given number of sheets is smaller than the threshold value.

As another example, the controller 100 may determine to apply liquid when the rigidity of the sheet P is equal to or greater than a threshold value and may determine to omit application of liquid when the rigidity of the sheet P is smaller than the threshold value.

The relation of positions of the liquid applicator 31 and the crimper 32 in the main scanning direction is not limited to the example illustrated in FIG. 3. For example, the positions of the liquid applicator 31 and the crimper 32 in the main scanning direction may be exchanged. In FIGS. 7A to 8C, the home positions HP1 and HP2 are not limited to positions on the right side of the sheet P, and may be positions on the left side of the sheet P.

In addition, in the above-described embodiment, the example in which the internal sheet tray 22 holding the sheets P is fixed and the liquid applicator 31 and the crimper 32 are movable. However, a method of exchanging the positions of the liquid applicator 31 and the crimper 32 with respect to the sheets P is not limited to the above-described example. As another example, the liquid applicator 31 and the crimper 32 may be fixed and the internal sheet tray 22 holding the sheet P may be movable. As yet another example, each of the liquid applicator 31, the crimper 32, and the internal sheet tray 22 holding the sheet P may be movable.

Further, the embodiments and modifications described above provide an example in which the moving mechanism 34 moves the binder 25 that executes the edge stitching process. Alternatively, the moving mechanism 34 may be applied to move the binder 28 that executes the saddle stitching process.

The control method described above may be implemented by, for example, a program. That is, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A post-processing apparatus comprising:
a tray configured to hold recording media on each of which an image is formed by an image forming apparatus;
a conveyor configured to convey the recording media toward the tray in a conveyance direction of the recording media;
a liquid applicator configured to apply liquid to the recording media held in the tray at a binding position at which the recording media is bound;
a crimper configured to press and deform the recording media at the binding position to bind the recording media; and
a mover configured to move the liquid applicator and the crimper separately along a surface of the recording media held in the tray in a main scanning direction orthogonal to the conveyance direction, wherein the mover comprises:
a liquid application motor configured to move the liquid applicator; and
a crimping motor configured to separately move the crimper.

2. The post-processing apparatus according to claim 1, wherein the mover is configured to move the liquid applicator and the crimper separately in the main scanning direction orthogonal to the conveyance direction, along a downstream end of the recording media held in the tray, in the conveyance direction of the recording media.

3. The post-processing apparatus according to claim 2, wherein the mover includes a guide shaft extending in the main scanning direction at a position downstream from the tray in the conveyance direction of the recording media and supporting the liquid applicator and the crimper movably in the main scanning direction.

4. The post-processing apparatus according to claim 1, further comprising circuitry to control the liquid applicator, the crimper, and the mover,
wherein the circuitry is configured to:
move the crimper to a standby position that is closer to a center of the recording media than the binding position in a main scanning direction orthogonal to the conveyance direction of the recording media;

cause the conveyor to convey each recording medium of the recording media to the tray until a number of the recording media reaches a given number of the recording media;

move the crimper to the binding position; and cause the crimper to execute crimp binding on the given number of the recording media held as a sheet bundle in the tray.

5. The post-processing apparatus according to claim 4, wherein the circuitry is further configured to:

move the liquid applicator to the binding position;

cause the conveyor to convey each recording medium of the recording media to the tray;

cause the liquid applicator at the binding position to apply liquid to each recording medium when each recording medium is conveyed to the tray;

cause the conveyor to convey each recording medium of the recording media to the tray until a number of the recording media reaches a given number of the recording media; and move the liquid applicator to a position that is different from the binding position.

6. An image forming system comprising:

an image forming apparatus to form an image on each of recording media; and a post-processing apparatus comprising:

a tray configured to hold recording media on each of which an image is formed by an image forming apparatus;

a conveyor configured to convey the recording media toward the tray in a conveyance direction of the recording media;

a liquid applicator configured to apply liquid to the recording media held in the tray at a binding position at which the recording media is bound;

a crimper configured to press and deform the recording media at the binding position to bind the recording media; and a mover configured to move the liquid applicator and the crimper separately along a surface of the recording media held in the tray in a main scanning direction orthogonal to the conveyance direction, wherein the mover comprises:

a liquid application motor configured to move the liquid applicator; and a crimping motor configured to separately move the crimper.

7. The image forming system of claim 6, wherein the mover is configured to move the liquid applicator and the crimper separately in the main scanning direction orthogonal to the conveyance direction, along a downstream end of the recording media held in the tray, in the conveyance direction of the recording media.

8. The image forming system according to claim 7, wherein the mover includes a guide shaft extending in the main scanning direction at a position downstream from the tray in the conveyance direction of the recording media and supporting the liquid applicator and the crimper movably in the main scanning direction.

9. The image forming system of claim 6, the post-processing apparatus further comprising circuitry to control the liquid applicator, the crimper, and the mover, wherein the circuitry is configured to:

move the crimper to a standby position that is closer to a center of the recording media than the binding position in a main scanning direction orthogonal to the conveyance direction of the recording media;

cause the conveyor to convey each recording medium of the recording media to the tray until a number of the recording media reaches a given number of the recording media;

move the crimper to the binding position; and cause the crimper to execute crimp binding on the given number of the recording media held as a sheet bundle in the tray.

10. The image forming system of claim 9, wherein the circuitry is further configured to:

move the liquid applicator to the binding position;

cause the conveyor to convey each recording medium of the recording media to the tray;

cause the liquid applicator at the binding position to apply liquid to each recording medium when each recording medium is conveyed to the tray;

cause the conveyor to convey each recording medium of the recording media to the tray until a number of the recording media reaches a given number of the recording media; and move the liquid applicator to a position that is different from the binding position.

11. A method of executing crimp binding on recording media, the method comprising:

holding the recording media in a tray;

conveying the recording media toward the tray in a conveyance direction of the recording media;

applying, by a liquid applicator, liquid to the recording media held in the tray at a binding position at which the recording media is bound;

pressing and deforming, by a crimper, the recording media at the binding position to bind the recording media; and moving, by a mover, the liquid applicator and the crimper separately along a surface of the recording media held in the tray in a main scanning direction orthogonal to the conveyance direction, wherein the liquid applicator is moved by a liquid application motor and the crimper is moved separately by a crimping motor.

* * * * *